Nov. 24, 1970 D. F. KENNEDY 3,543,157
GUARDED READOUT SYSTEMS
Filed Nov. 26, 1968
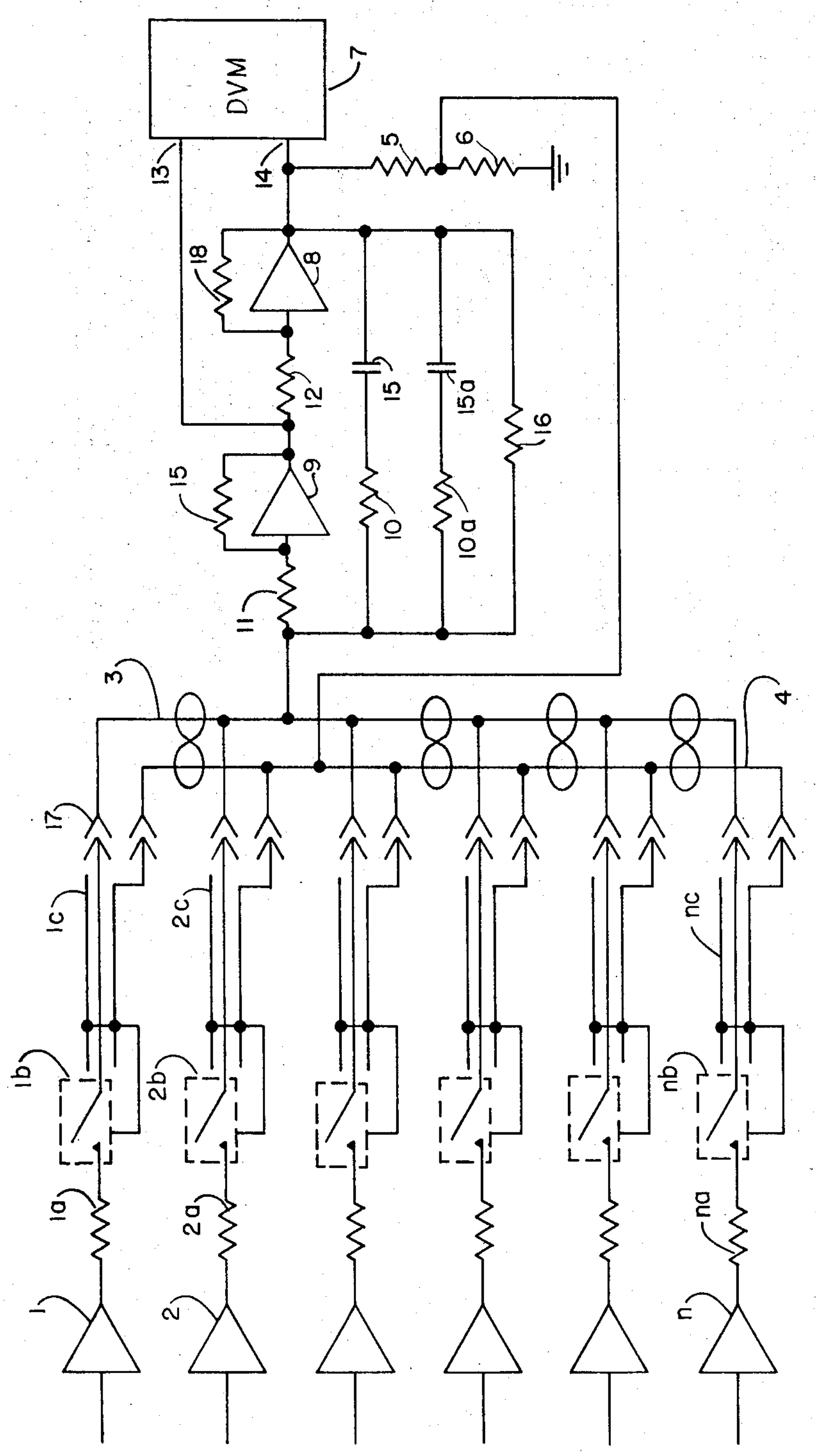
INVENTOR.
DONALD F. KENNEDY
BY [signature]

United States Patent Office 3,543,157

Patented Nov. 24, 1970

3,543,157

GUARDED READOUT SYSTEMS

Donald F. Kennedy, South Toms River, N.J., assignor to Electronic Associates Inc., Long Branch, N.J., a corporation of New Jersey Filed Nov. 26, 1968, Ser. No. 778,952

Int. Cl. G01r 7/00

U.S. Cl. 324—140 3 Claims

ABSTRACT OF THE DISCLOSURE

An improved readout system for an analog computer is obtained by providing a guard bus for the readout bus and routing copper on the printed circuit cards on which the computing elements are formed, and maintaining the guard bus and the routed copper at the same potential as the readout bus, thereby greatly reducing the effects of leakage resistance, capacity, and ion migration on the readout signal carried by the readout bus.

This invention relates to a readout system in an analog computer, and more particularly, to a readout system which greatly reduces the effects of leakage resistance, capacity and ion migration of the readout bus.

Analog computers include many types of computing elements which are interconnected in accordance with a program to simulate the behavior of a dynamic system. With the computing elements interconnected, it may be desired to read out the results produced by various ones of the computing elements. Specifically, prior art analog computers have utilized relay systems to selectively connect the output terminals of computing elements in turn to a voltage readout system including at least one direct coupled readout amplifier.

The voltage readout is connected to the fixed contact of each output relay of the computing element by way of a common bus called the readout bus. The outputs of the computing elements are connected to the respective relay movable contacts via a high series resistance. The series resistance serves to limit the output current of the computing element to a safe value so that, upon disconnection of a first computing element from the bus, and connection of a second computing element to the bus, the second element will be protected from having a high current applied to its output. This protection is important since analog computing elements such as direct coupled amplifiers are characterized by their low output impedance.

A problem that has existed for some time in the analog computer results from the leakage resistance, stray capacitance and ion migration in the readout bus itself. These leakage components cause current to be drawn from the output of the computing elements. This current appears as a voltage drop across the series resistance which causes an inaccuracy in the readout of the computing element. Further description of the effects of the leakage of the bus and a means for compensating for this leakage is disclosed in U.S. Pat. No. 3,412,342, in the name of Tonnessen, a co-worker of applicant.

In the past, leakage resistance was reduced by detailed selection and assembly of components. Relays were chosen for low leakage coefficients and the printed circuit cards were carefully prepared. In addition, the compensating network of the aforementioned Tonnessen patent was employed. This approach brought the effects of leakage to an acceptable level.

The present invention reduces the readout leakage bus values of prior art computers by a factor of one thousand. In prior readout bus theory leakage resistance, stray capacitance and ion migration were developed between the readout bus and ground. The present invention involves lifting the ground point and connecting it to an output of the unloading network. This connection is accomplished by:

(1) Connecting all relay cases to a bus called the readout guard bus; and (2) Routing copper on the printed circuit card around the readout bus and connecting the conductor thus formed to the readout guard bus.

The primary causes of such leakage have been isolated at the relay and on the printed circuit card which constitutes the computing element. When the relay is open or closed, current flows between the contacts and the relay casing via the leakage resistance in the relay. On the printed circuit card, leakage resistance and stray capacitance is present between the readout bus and the various components mounted on the card. Thus, by maintaining the relay case at the same potential as the output voltage being conducted by the relay, no current can flow between the case and the contacts; and by routing copper around the readout bus and holding the copper at the same potential as the bus, no current can flow between the components and the bus.

This results in the potential of the leakage paths being the same as the potential of the readout bus, so that no current can be drawn through the leakage paths; thus, no voltage drop can occur across the series resistor.

It is an object of the present invention to increase the accuracy of an analog computer.

Another object of the present invention is to reduce the effects of leakage resistance and stray capacitance on the output signal in an analog computer readout system.

These as well as further objects and advantages of the invention will become apparent from a reading of the following specification with reference to the accompanying drawings in which:

The single figure is a schematic diagram of the readout system according to the invention.

In the drawing, numerals 1, 2 . . . *n* denote a plurality of computing elements in an analog computer. These elements are shown as operational amplifiers but it will be understood that they could also be potentiometers, multipliers, etc. The outputs of the computing elements are connected to the fixed contact of their respective relays 1*b*, 2*b* . . . *nb* for selective application of the outputs to a readout bus 3 via large valued resistors 1*a*, 2*a* . . . *na*. Each of the relays include a fixed contact, a moveable contact and a casing.

The casings of the relays are connected to a bus 4 which is called the readout guard.

Buses 3 and 4 are, in actuality, formed in part, on the printed circuit card and, in part, of electrical cable The two portions are joined by an electrical connector shown generally at 17. The cable portions are joined in a twisted pair and are connected to an unloading network of the type disclosed in the aforementioned Tonnessen patent. Readout guard bus 4 includes routed copper 1*c*, 2*c* . . . *nc* which is formed on the printed circuit card surrounding readout bus 3. More particularly, portions 1*c*, 2*c* . . . *nc* of guard bus 4 and a portion of readout bus 3 are physically etched onto the printed circuit card constituting the computing element. The etched conductors are referred to as "routed copper."

The unloading network includes a direct coupled amplifier 9 having positive feedback and a gain greater than one to produce direct current unloading. Resistor 11 is the input resistor to this stage while resistor 15 serves as its feedback resistor. The positive feedback network also includes a plurality of A.C. networks producing an A.C. gain greater than one to compensate for the distributed wiring capacitance. These networks are formed of resistors 10, **10*a*, and capacitors 15, 15*a*. Resistor 16** is the D.C. feedback resistor which supplies current to the input of the unloading network.

The outputs of amplifiers 8 and 9 are connected to input terminals 13 and 14 of a digital voltmeter 7. The selection of resistors 11, 15 and 12, 18 is such that the outputs of amplifiers 8 and 9 are of equal values. As the amplifiers are of the inverting types, their outputs are thus of opposite polarity.

The output of amplifier 8 is connected to the guard bus 4 via a voltage divider consisting of resistors 5 and 6. The digital voltmeter 7 requires as an input voltage, a magnitude greater than the magnitude of the voltage at the input of amplifier 9; thus, the voltage divider is employed to drop the output of amplifier 8 to a value equal to the input voltage of amplifier 9.

In this manner, the guard bus 4 is maintained at the same potential as readout bus 3 preventing any current flow and resultant voltage drop from influencing the output signal of any selected computer element, since the guard bus is connected to both the relay cases and to the routed copper.

I claim:

1. A readout system for a plurality of analog computing elements comprising:
- a readout bus,
- a plurality of relays having casings, one for each computing element, connected to said readout bus for selective connection of said elements to said bus,
- means connected to said readout bus for providing an indication of the outputs of said elements,
- a readout guard bus in proximity to said readout bus connected to said relay casings and to said indicating means, thereby maintaining the same potential on said guard bus and readout bus for blocking the leakage paths of said readout bus.

2. The readout system of claim 1 wherein said indicating means includes a meter, an unloading network connected between said meter and said readout bus and a voltage divider connected between said network and guard bus so that the signal on said guard bus is the same as the signal on said readout bus.

3. A readout system for an analog computer comprising:
- a plurality of computing elements,
- a readout bus,
- a plurality of relays each having a casing connected between said elements and said bus for selectively connecting said elements to said bus,
- an unloading network connected to said bus for preventing current from being drawn from said elements when they are connected thereto, and for providing an output representing the signal on said bus,
- a guard bus connected to said casings and surrounding said readout bus, and
- a potentiometer connected between the output of said unloading network and said guard bus to maintain the guard bus at the same signal level as said readout bus, thereby reducing readout bus leakage paths.

References Cited

UNITED STATES PATENTS

| | | | |
|---|---|---|---|
| 3,361,899 | 1/1968 | Massell et al. | 324—140 XR |
| 3,412,342 | 11/1968 | Tonnessen | 330—76 |

ALFRED E. SMITH, Primary Examiner

U.S. Cl. X.R.

324—126